April 26, 1960　　　H. H. TODD　　　2,934,632
METHOD OF AND APPARATUS FOR FEEDING MAGNETIC
WELDING POWDER TO WELDING WIRE
Filed May 20, 1957　　　2 Sheets-Sheet 1
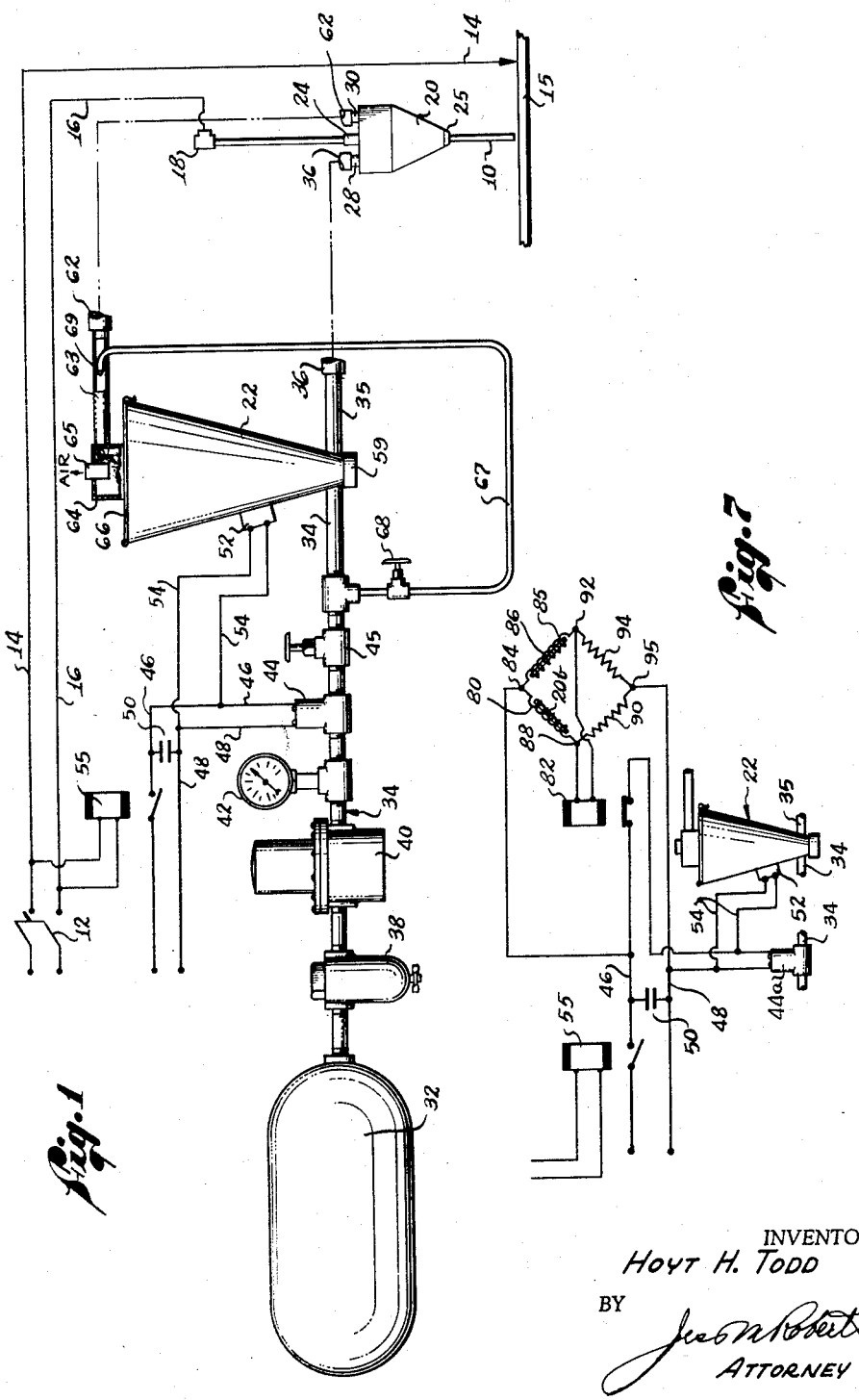
INVENTOR.
HOYT H. TODD
BY
ATTORNEY April 26, 1960 H. H. TODD 2,934,632
METHOD OF AND APPARATUS FOR FEEDING MAGNETIC
WELDING POWDER TO WELDING WIRE
Filed May 20, 1957 2 Sheets-Sheet 2
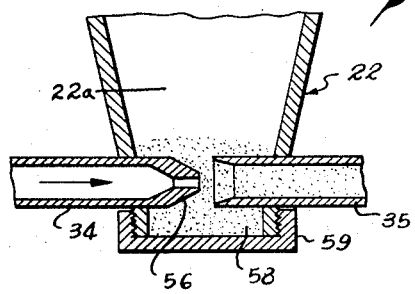
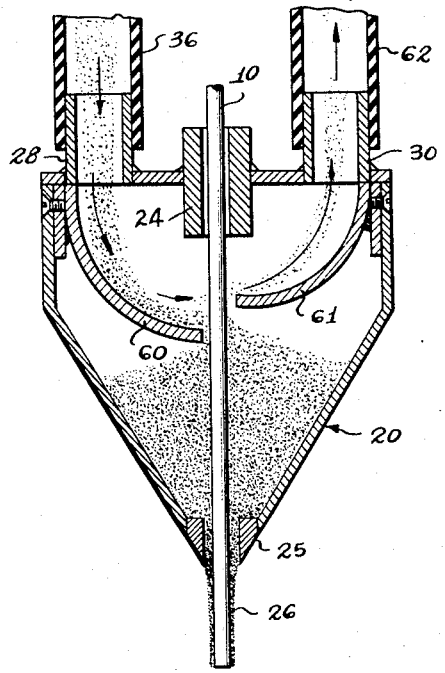
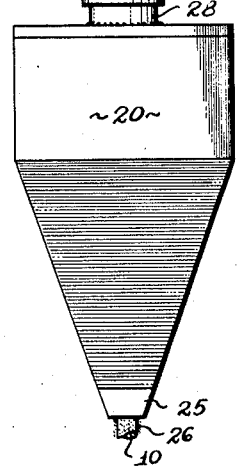
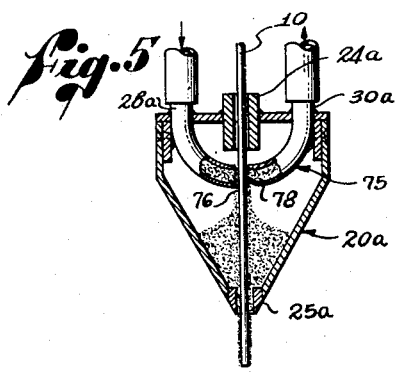
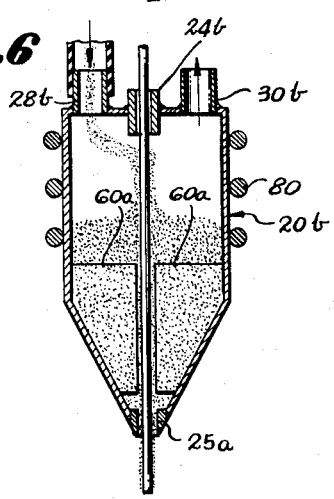
INVENTOR.
HOYT H. TODD
BY
ATTORNEY United States Patent Office 2,934,632
Patented Apr. 26, 1960

2,934,632

METHOD OF AND APPARATUS FOR FEEDING MAGNETIC WELDING POWDER TO WELDING WIRE

Hoyt H. Todd, Whittier, Calif., assignor to Western Carbide Corporation, North Hollywood, Calif., a corporation of California Application May 20, 1957, Serial No. 660,187

15 Claims. (Cl. 219—130)

This invention relates to electric arc welding techniques in which magnetically responsive powder is fed to an electrically charged welding wire to form a coating thereon by magnetic attraction whereby the powder travels with the wire to the electric arc. Such a powder comprises clusters of magnetic and nonmagnetic particles, the nonmagnetic particles including alloys and fluxing materials. The invention is specifically directed to the problem of feeding the powder to the traveling wire.

The prevalent type of welding apparatus for this purpose employs a hopper with a bottom outlet. The hopper holds a supply of the magnetically responsive powder which is retained in the hopper by a pair of diametrically opposite permanent magnets at the bottom outlet. The welding wire is fed into the hopper and out through the bottom outlet automatically at whatever rate it is consumed at the arc, and the welding current attracts the powder in the hopper to the wire to form the desired coating thereon.

One limitation of this prior art procedure is that the permanent magnets must be strong enough to hold back the bulk of the powder in the hopper and yet weak enough to permit passage of the powder coating on the charged wire. If the magnets are too weak, the powder supply escapes from the hopper; if they are too strong, they cause the powder to jam or bridge the hopper outlet with consequent stripping of the desired powder coating from the wire. In practice, it is not too difficult to design such a hopper to function in an acceptable manner with a welding powder of a given moderate responsiveness to magnetic force, but to change to a powder having a different degree of magnetic responsiveness—especially a relatively high degree—is to invite trouble. In some instances, a higher than usual iron content is desirable in the powder, but the consequent increase in the magnetic responsiveness of the powder would make the apparatus inoperative by blocking the hopper outlet.

Another disadvantage of the prior procedure is that it is not conductive to efficiency in welding by hand as distinguished from fully automatic machine welding. The hopper is too heavy and cumbersome for easy handling and is impractical for prolonged periods of welding by hand.

A further serious disadvantage of the prior procedure is that the hopper must remain substantially upright in position to be operative for its purpose. Consequently, the welding procedure is primarily applicable to horizontal welding. Difficulties are encountered in any attempt to make a vertical weld and the apparatus cannot be used at all for overhead welding.

The broad object of the present invention is to provide a welding method and apparatus for carrying out the method wherein the degree of magnetic responsiveness of the powder is not critical, the operator is not required to manipulate a hopper, and overhead welding may be carried out easily and efficiently.

In general, this broad object is accomplished by providing a small and relatively light dispensing chamber around the charged wire and by pneumatically conveying the magnetically responsive powder thereto. As will be explained, certain features of the invention relate to the entraining of the powder in a conveying air stream at a supply hopper and the subsequent separation of the powder from the air stream at the dispensing chamber.

In one practice of the invention, an adequate supply of powder in the dispensing chamber is assured by delivering the powder thereto continuously at an excessive rate and continuously returning the excess powder to the supply hopper for recycling. In another practice, the pneumatic conveyance of the powder is controlled automatically in response to changes in quantity of powder in the dispensing chamber.

The preferred practice of the invention has the further feature that the operation of the pneumatic conveying system is responsive to the welding current and functions only when the welding circuit is closed. Thus, no manipulation of special controls is necessary and the operator carries out a welding operation in the usual manner without paying any particular attention to the means for feeding the powder to the welding wire.

The above and other objects, features and advantages of the invention will be apparent from the following detailed description together wtih the accompanying drawings.

In the drawings, which are to be regarded as merely illustrative:

Fig. 1 is a diagrammatic view of a selected embodiment of the invention;

Fig. 2 is a fragmentary sectional view of the bottom portion of the supply hopper;

Fig. 3 is a vertical sectional view of the dispensing chamber through which the welding wire travels;

Fig. 4 is a side elevational view of the dispensing chamber;

Fig. 5 is a sectional view similar to Fig. 3 showing a second form of dispensing chamber;

Fig. 6 is a sectional view similar to Fig. 3 showing the construction of a third form of dispensing chamber that may be employed; and Fig. 7 is a wiring diagram of the electrical control system for the dispensing chamber shown in Fig. 5.

In the schematic arrangement of the first embodiment shown in Fig. 1, a welding wire 10 is placed in a welding circuit in the usual manner, the welding circuit being controlled by a switch 12 and having one of its leads 14 grounded to the workpiece 15. The other lead 16 of the welding circuit is electrically connected to the welding wire 10 by a collar 18 of conducting material through which the welding wire travels in a sliding manner. In accord with the teachings of the invention, a small lightweight dispensing chamber 20 surrounds the traveling welding wire 10 to confine a small supply of the magnetically responsive welding powder, which supply is continually replenished from a remote stationary source such as a conical supply hopper 22.

As best shown in Figs. 3 and 4, the dispensing chamber 20 may be in the form of a closed metal receptacle having an entrance port for the welding wire 10 in the form of a sleeve 24 and a dispensing port or exit port for the wire in the form of a bushing 25. The entrance sleeve 24 fits the traveling welding wire 10 closely enough to prevent any substantial passage of air therethrough and the inside diameter of the exit bushing 25 is sufficiently larger than the outside diameter of the welding wire 10 to permit a coating 26 of a desired thickness of the magnetically responsive welding power to adhere to the emerging welding wire. Preferably, the dispensing chamber 20 is of tapered configuration with the exit bushing 25 at the small end as shown in the drawings. The dispensing chamber 20 also has an inlet in the form of a short nipple 28 and an outlet in the form of a short nipple 30 so that a stream of gaseous fluid, such as a stream of compressed air, entraining the welding powder may enter the dispensing chamber through the nipple 28 to deposit the welding powder therein, the air stream then being discharged through the outlet nipple 30.

Within the scope of the invention, any suitable arrangement may be employed for causing a gaseous stream to entrain welding powder from the supply hopper 22 and to deliver the entrained welding powder to the dispensing chamber 20 in a replenishing manner. In the arrangement illustrated by Fig. 1, for example, a suitable source of compressed air represented by a pressure tank 32 is connected to the hopper 22 by passage means in the form of a pipeline 34. The hopper 22 is connected to the dispensing chamber 20 by a passage means comprising a short pipe 35 on the side of the hopper and a hose 36 that connects the short pipe with the inlet nipple 28 of the feed chamber.

The pipeline 34 may be provided with a water trap 38, a pressure regulator 40, a pressure gauge 42, a solenoid valve 44 to control the periods of air flow, and a manual valve 45 for regulation of the rate of air flow. In a typical practice of the invention, the pressure regulator 40 reduces the air pressure to approximately 5 to 10 p.s.i. and the inside diameters of the various passage means may be on the order of 5/16 inch.

The solenoid valve 44 is energized from a suitable power source by a control circuit comprising two leads 46 and 48, the two leads being shunted by a capacitor 50 for spark suppression. A suitable vibrator 52 may be mounted on the side of the hopper 22. In this instance the vibrator is an electrical buzzer connected to the control circuit for energization by a pair of wires 54. It is contemplated that the control circuit will be energized synchronously with the welding circuit, and for this purpose a relay 55 may be provided in parallel with the welding circuit to control energization of the control circuit.

A suitable means for entraining the magnetically responsive welding powder in the air stream is the arrangement in the bottom of the hopper 22 that is shown in Fig. 2. The lower tapering portion 22a of the hopper 22 is a material inlet to the material-entraining means at the bottom of the hopper. The pipeline 34 extends into the bottom of the hopper 22 and terminates in a nozzle 56 having a restricted orifice. This nozzle 56 is a gaseous fluid inlet of the material-entraining means. The previously mentioned pipe 35 also extends into the interior of the hopper 22, and, preferably, is slightly flared at its entrance to provide a discharge outlet for the material-entraining means. The flared entrance of the pipe 35 is coaxial with the nozzle 56 and is spaced axially therefrom to provide sufficient clearance space therebetween for the powder to reach the air stream from the nozzle. It is apparent that this arrangement will function in the manner of a venturi to draw the welding powder 58 into the pipe 35 for conveyance to the inlet nipple 28 of the dispensing chamber by means of the hose 36. The bottom end of the hopper 22 may be provided with a removable screw cap 59 for access to the region of the nozzle 56.

As may be seen in Fig. 3, the air stream, in moving through the dispensing chamber from the inlet nipple 28 to the outlet nipple 30, makes a 180° change in direction to produce a strong tendency for the welding powder 58 to separate from the air stream by inertia. In this practice of the invention, separation of the welding powder from the air stream in the dispensing chamber 20 is accomplished by a pair of curved baffles 60 and 61 which terminate on opposite sides of the traveling welding wire 10. The baffle 60 is adjacent the air inlet nipple 28 to deflect the air stream along a curved path so that the heavy powder entrained in the air stream will tend by its inertia to move against the baffle and to follow the curved baffle surface. The end of the second baffle 61 is positioned radially inward from the end of the baffle 60 with respect to the curvature of the path of deflection flow, as may be seen in Fig. 3, so that the powder traveling down the curved baffle 60 is directed under the baffle 61 through the gap between the baffles into the space outside the baffles in the region of the exit port formed by the bushing 25. Since the air stream seeks the path of least resistance to the outlet nipple, the air stream changes direction more abruptly than the change in direction represented by the baffle 60 and this fact is further conducive to the separation of the welding powder from the air stream. It is apparent that powder will be deflected from the air stream into the space outside the two baffles as long as there is room for additional welding powder in this space, but whenever the space outside the two baffles becomes completely filled with welding powder, the newly entering welding powder is kept in entrainment in the air stream so that the powder will be discharged through the outlet nipple 30 as fast as it is introduced through the inlet nipple 28. Thus if the powder is supplied to the air stream at a somewhat greater rate than the rate at which the powder which is consumed in the welding process, the dispensing chamber 20 will be continually replenished to hold a maximum supply of the powder at all times.

In the present practice of the invention, the welding powder is supplied to the dispensing chamber 20 at a rate slightly in excess of the demand and the excess welding powder is recycled by returning the air stream to the hopper 22. For this purpose, a return hose 62 connects the outlet nipple 30 of the dispensing chamber 20 with a return pipe 63 that enters a cyclone separator 64 tangentially thereof, the cyclone separator being positioned on top of the hopper 22 to drop the returned welding powder into the hopper. The cyclone separator 64 may be of conventional construction having an axial tube 65 for upward escape of the air from the air stream, the bottom of the cyclone separator opening onto the interior of the supply hopper 22. In the construction shown, the cyclone separator 64 is mounted on a hinged cover 66 of the supply hopper.

It is to be noted that the venturi arrangement provided by the nozzle 56 and the adjacent end of the pipe 35 creates a tendency for a portion of the returned air to be recycled to the dispensing chamber 20. Thus, the tendency of air to flow into the flared entrance of the pipe 35 together with the vibration of the hopper by the vibrator 52, assures continuous gravitational movement of the powder to the bottom of the hopper to keep the conveying air stream replenished.

A further feature of the arrangement shown in Fig. 1 is the provision of a boosting air stream to add energy to the air stream that returns the surplus welding powder from the dispensing chamber 20 to the supply hopper 22. For this purpose, a tube 67 having a manually adjustable valve 68 branches from the pipeline 34 and terminates in a nozzle 69 that is directed downstream inside the return pipe 63. The valve 68 may be adjusted for the various rates of air flow.

In this first practice of the invention, it is contemplated that the rate of air discharge from the nozzle 69 will be high enough to create subatmospheric pressure in the return hose 62 and in the interior of the dispensing chamber 20. One advantage of creating subatmospheric pressure in the dispensing chamber 20 is the resultant high pressure differential along the supply hose 36 to favor high velocity of air flow therein. Another advantage is that with subatmospheric pressure prevailing inside the dispensing chamber 20, air tends to leak into the chamber rather than out of the chamber and this action discourages leakage of powder from the dispensing chamber at the joints in its construction. The most important advantage, however, is that maintaining a relatively low pressure in the dispensing chamber 20 eliminates any possibility of air flowing outward through the wire exit port provided by the bushing 25. Such an air stream directed towards the workpiece would have a serious effect on the weld.

The manner in which the invention serves its purpose may be readily understood from the foregoing description. Whenever the switch 12 is closed and an arc is struck at the end of the welding wire 10, the flow of welding current causes energization of the relay 55 with consequent opening of the normally closed solenoid valve 44 for air flow through the pipeline 34 into the bottom of the hopper 22. The air stream continuously entrains welding powder for delivery to the dispensing chamber 20 and the surplus welding powder is continuously returned to the hopper 22 through the return hose 62 for recycling.

An important feature of the invention is that the described apparatus may be used for overhead welding with the dispensing chamber 20 turned upside down. Successful operation in this manner is accomplished by operating the air stream at such velocity that the tendency of the powder to separate from the air stream by inertia and thus pass through the gap between the baffles 60 and 61 overcomes the gravitational tendency of the accumulated stored powder to return through the gap.

Means may be provided for automatic regulation of the rate of travel of the welding wire 10 in accord with the rate of consumption of the wire by the arc in a well known manner. The dispensing chamber 20, with the two hoses 36 and 62 connected thereto, is light in weight and, even when combined with means for automatically advancing the welding wire, is light enough for prolonged hand-welding without undue fatigue.

Fig. 5 shows a modified form of dispensing chamber, generally designated 20a, which functions in the same manner as the dispensing chamber 20 and may be substituted for the dispensing chamber 20. In the construction shown in Fig. 5, the air inlet 28a and the air outlet 30a are the two ends of a U-shaped tube 75 that replaces the two curved baffles 60 and 61. The U-shaped tube 75 is apertured diametrically to permit the passage of the welding wire 10 therethrough, the wire entering through an entrance sleeve 24a and moving out of the dispensing chamber through a bushing 25a. At the lowest point of curvature of the U-shaped tube 75 the wall on the outside curve of the tube is slit and deformed to provide an opening 76 for escape of the powder into the interior of the dispensing chamber and to provide an upwardly turned lip 78 which corresponds in function to the previously described baffle 61. Thus the welding powder in tending to follow the outside curvature of the U-shaped tube 75 is directed into the interior of the dispensing chamber in the same manner as heretofore described.

Fig. 6 shows a dispensing chamber 20b which may be used in another practice of the invention. The dispensing chamber 20b is generally similar in construction with the previously described dispensing chamber 20, as indicated by the use of corresponding numerals to indicate corresponding parts.

In this particular practice of the invention, it is contemplated that the dispensing chamber 20b will be used only in upright position, and that welding powder will be delivered thereto through the supply hose only intermittently as required to maintain a minimum supply of the welding powder in the dispensing chamber. Since there is no substantial amount of surplus welding powder to be recycled, the outlet nipple 30b may be open to the atmosphere.

Any suitable means may be employed to sense or detect the quantity of welding powder in the dispensing chamber 20b and to control a solenoid valve 44a corresponding to the solenoid valve 44 for delivery of the welding powder to the dispensing chamber as required. In this instance, the sensing means comprises an electrical coil 80 that surrounds the upper portion of the elongated dispensing chamber so that the impedance of the coil varies with the quantity of the welding powder in the dispensing chamber. The electrical coil 80 may control the solenoid valve 44a by means of a Wheatstone bridge and an associated relay 82 shown in Fig. 7.

The electrical coil 80 surrounding the dispensing chamber 20b forms one leg of the Wheatstone bridge and is connected at a juncture point 84 with a second identical coil 85 that surrounds a core 86. The core 86 is selected to give the coil 85 substantially the same impedance as the coil 80 when a predetermined minimum quantity of the welding powder is present in the feed chamber 20b. The coil 80 is connected at a juncture point 88 with a resistor 90 and the coil 85 is connected at a juncture 92 with an identical resistor 94, the two resistors 90 and 94 being interconnected at a fourth juncture 95 to complete the Wheatstone bridge.

The relay 82 is connected across the two junctures 88 and 92 to be energized by voltage differences between the two juncture points 88 and 92. The relay 82 is normally closed, i.e., closed to complete the previously described control circuit through the solenoid valve 44a in the absence of an effective voltage difference across the two junctures 92 and 88 of the Wheatstone bridge. In all other respects, the control circuit for the solenoid valve 44a is the same as heretofore described, as indicated by the use of corresponding numerals. If desired, the relay 55 that makes the control circuit responsive to the flow of welding current may be omitted so that control resides solely in the relay 82.

Whenever the supply of welding powder in the dispensing chamber 20b drops to the predetermined minimum quantity with consequent balanced voltage across the Wheatstone bridge, the relay 82 is de-energized and closes to cause the solenoid valve 44a to open for replenishing flow of welding powder to the dispensing chamber. When the supply of welding powder in the dispensing chamber 20b is replenished, the consequent change in the impedance of the coil 80 relative to the impedance of the coil 85 causes unbalanced voltage across the Wheatstone bridge and relay 82 opens the control circuit to de-energize the solenoid valve 44a. Thus, the relay 82 operates intermittently in an automatic manner as required to maintain an adequate supply of welding powder in the dispensing chamber 20b. It is apparent that the relay 82 may be normally open instead of normally closed with the reference impedance of the coil 85 balanced with the impedance of the coil 80 for a predetermined maximum quantity of welding powder in the dispensing chamber 20b, instead of a minimum quantity.

My description in detail of selected practices of the invention will suggest various changes, substitutions and other departures from my disclosure within the spirit and scope of the appended claims.

I claim as my invention:

1. Means to supply a stream of finely divided solid material to a dispensing zone, comprising: a receptacle for the finely divided material; means forming a dispensing chamber having a gaseous fluid inlet, a gaseous fluid outlet and a dispensing outlet at said zone for the finely divided material; passage means connected with said inlet; material-entraining means having a gaseous fluid inlet for connection with a compressed air source, a material inlet to receive finely divided material from said receptacle and a discharge outlet connected with said passage means to deliver thereto a gaseous stream entraining the finely divided material for conveyance to said dispensing chamber, said dispensing chamber being of a configuration for a 180° change in direction of the gaseous stream in the chamber for separation of the finely divided material from the gaseous stream by inertia.

2. Means to supply a stream of finely divided solid magnetic material to a welding zone, comprising: a welding wire; a welding circuit to energize the wire whereby said finely divided material is magnetically attracted thereto; a receptacle for the finely divided material; means forming a dispensing chamber having a gaseous fluid inlet, a gaseous fluid outlet, a dispensing outlet and an entrance port for said wire to permit the wire to travel through said chamber and out said dispensing outlet thereby to permit the wire to pick up a coating of the finely divided magnetic material in the dispensing chamber; passage means connected to said inlet; material-entraining means having a gaseous fluid inlet for connection to a compressed air source, a material inlet to receive the finely divided material from said receptacle and a discharge outlet connected with said passage means to deliver thereto a gaseous stream entraining the finely divided material for conveyance to said inlet of the dispensing chamber, said dispensing chamber being of a configuration for a 180° change in direction of the gaseous stream in the chamber for separation of the finely divided material from the gaseous stream by inertia; and control means responsive to current flow through said wire to synchronize the flow of the gaseous stream with the flow of electric welding current.

3. Means to supply a stream of finely divided solid material to a dispensing zone, comprising: a receptacle for the finely divided material; a dispensing chamber having a gaseous fluid inlet, a gaseous fluid outlet and a dispensing outlet at said zone for the finely divided material; passage means connected with said inlet; material-entraining means having a gaseous fluid inlet for connection with a compressed gaseous fluid source to receive a gaseous stream therefrom, an inlet to receive the finely divided material from said receptacle for entrainment in said gaseous stream and a discharge outlet connected with said passage means to deliver thereto the gaseous stream entraining the finely divided material, said dispensing chamber being of a configuration for change in direction of the gaseous stream in the chamber for separation of the finely divided material from the gaseous stream by inertia; and a return passage from said gaseous fluid outlet of the dispensing chamber to convey the gaseous stream with the residual finely divided material therein back to said receptacle.

4. An apparatus as set forth in claim 3 which includes means to lower the pressure in said return passage below atmospheric pressure thereby to lower the pressure in said dispensing chamber to prevent the gaseous fluid from blowing out said dispensing outlet.

5. An apparatus as set forth in claim 3 which includes means to separate the residual finely divided material from the returning gaseous stream, said separating means having an inlet connected to said return passage and having an outlet connected to said receptacle.

6. An apparatus as set forth in claim 3 in which said return passage has an inlet connected with a source of compressed gaseous fluid to boost the energy of the returning gaseous stream.

7. An apparatus as set forth in claim 6 in which said return passage is connected with a source of compressed gaseous fluid to boost the velocity of the returning gaseous stream sufficiently to lower the pressure in said dispensing chamber to a pressure not substantially greater than atmospheric pressure to keep the gaseous fluid in said chamber from blowing out of said dispensing outlet.

8. An apparatus as set forth in claim 7 for use with finely divided magnetic material in which said dispensing chamber has an entrance port for welding wire to permit the welding wire to travel through the chamber and out said dispensing outlet to permit the wire to pick up a coating of the finely divided magnetic material.

9. Means to maintain a small supply of finely divided solid material at a zone of use, comprising: a small enclosure forming a dispensing chamber having a gaseous fluid inlet, a gaseous fluid outlet and an exit for dispensing the powder; a first passage means for flow of a stream of compressed gaseous fluid to said gaseous fluid inlet; means to store a supply of the finely divided material; means to feed the finely divided material from said storing means to said first passage means to be entrained by said gaseous stream; a second passage means from said gaseous fluid outlet to return the gaseous stream to said storing means for recycling of the finely divided material; and walls in said chamber to direct the gaseous stream from said gaseous fluid inlet to said gaseous fluid outlet in a curved path, said walls forming a gap on the outer side of the curvature of the path located for projection of the finely divided material out of the gaseous stream through the gap by inertia into the region of said exit port whereby the accumulation of excessive finely divided material in the space between the gap and the exit port closes the gap to prevent further separation of the finely divided material from the gaseous stream as long as the excessive accumulation exists.

10. Means to supply a stream of finely divided solid material to a dispensing zone, comprising: a receptacle for the finely divided material; means forming a dispensing chamber having a gaseous fluid inlet, a gaseous fluid outlet and a dispensing outlet at said zone for the finely divided material; passage means connected with said gaseous fluid inlet; material-entraining means having a gaseous fluid inlet for connection with a compressed gaseous fluid source, a material inlet to receive finely divided material from said receptacle and a discharge outlet connected with said passage means to deliver thereto a gaseous stream entraining the finely divided material; and control means responsive to changes in the quantity of powder in said dispensing chamber to cut off said stream when the quantity is relatively large and to restore flow of the stream when the quantity is relatively low.

11. An apparatus as set forth in claim 10, in which said control means includes an electrically actuated valve and a Wheatstone bridge for sensing changes in the quantity of powder in said chamber.

12. A method of continuously coating an electrically charged portion of a welding wire with magnetically responsive welding powder for movement with the wire to feed an electric arc at the end of the wire, including the steps of: enclosing a space surrounding the moving charged portion of the wire with clearance around the wire for a coating of a desired thickness of the powder; entraining the welding powder in a stream of gaseous fluid; directing said stream into said space; changing the direction of the stream inside said space for removal of powder from the stream by inertia; and withdrawing gaseous fluid from said space at a sufficiently high rate to maintain relatively low pressure in said space to prevent discharge of the gaseous fluid through said clearance.

13. A method as set forth in claim 12 in which the gaseous fluid is withdrawn from said space at a sufficiently high rate to maintain subatmospheric pressure in said space to prevent discharge of the gaseous fluid from the space through said clearance.

14. A method as set forth in claim 12 which includes the step of directing a jet of gaseous fluid into the gaseous stream that is withdrawn from said space thereby to increase the velocity of the withdrawn stream to lower the pressure in said space.

15. An apparatus as set forth in claim 10 in which said dispensing chamber is of a configuration for a change in direction of the gaseous stream in the chamber for separation of the finely divided material from the gaseous stream by inertia.

(References on following page)

References Cited in the file of this patent

UNITED STATES PATENTS

| | | |
|---|---|---|
| 2,187,376 | Guibert | Jan. 16, 1940 |
| 2,548,487 | Marchant | Apr. 10, 1951 |
| 2,727,125 | Muller | Dec. 13, 1955 |
| 2,766,360 | Landis et al. | Oct. 9, 1956 |
| 2,801,880 | Rienecker | Aug. 6, 1957 |
| 2,805,323 | Cushman | Sept. 3, 1957 |
| 2,820,137 | Ghemar et al. | Jan. 14, 1958 |

FOREIGN PATENTS

| | | |
|---|---|---|
| 607,368 | Great Britain | Aug. 30, 1948 |